United States Patent
Snow

(10) Patent No.: US 7,797,701 B1
(45) Date of Patent: Sep. 14, 2010

(54) METHOD AND APPARATUS FOR DETECTING A BIT SEQUENCE IN A DATA STREAM

(75) Inventor: John F. Snow, Taylorsville, UT (US)

(73) Assignee: Xilinx, Inc., San Jose, CA (US)

(*) Notice: Subject to any disclaimer, the term of this patent is extended or adjusted under 35 U.S.C. 154(b) by 1797 days.

(21) Appl. No.: 10/917,565

(22) Filed: Aug. 13, 2004

(51) Int. Cl.
*G06F 9/46* (2006.01)
*H04J 3/06* (2006.01)

(52) U.S. Cl. .................... 718/100; 370/503

(58) Field of Classification Search ............... 718/100; 341/67; 365/230.05; 370/503
See application file for complete search history.

(56) References Cited

U.S. PATENT DOCUMENTS

| | | | | |
|---|---|---|---|---|
| 5,566,123 A | * | 10/1996 | Freidin et al. | 365/230.05 |
| 5,677,690 A | * | 10/1997 | Sohn | 341/67 |
| 5,835,035 A | * | 11/1998 | Bakhmutsky | 341/67 |
| 5,982,786 A | * | 11/1999 | Grivna | 370/503 |

OTHER PUBLICATIONS

John F. Snow; "Serial Digital Interface (SDI) Video Decoder"; XAPP288 (1.1); Apr. 26, 2004; available from Xilinx, Inc., 2100 Logic Drive, San Jose, California 95124; pp. 1-11.

John F. Snow; "HD-SDI Receiver Using Virtex-II Pro Rocket IO Multi-Gigabit Transceivers"; XAPP681 (v1.0); Dec. 12, 2003; available from Xilinx, Inc., 2100 Logic Drive, San Jose, California 95124; pp. 1-27.

* cited by examiner

*Primary Examiner*—Meng-Ai An
*Assistant Examiner*—Eric C Wai
(74) *Attorney, Agent, or Firm*—Robert M. Brush; Lois D. Cartier

(57) ABSTRACT

Method and apparatus for detecting a bit sequence in a data stream is described. In one example, a first memory is configured to process pairs of bit-patterns in the data stream to provide respective pairs of codes from a code table stored in said first memory. A second memory is configured to process pairs of codes from the first memory to provide combination codes from a combination code table stored in the second memory. A third memory is configured to generate detection data in response to a sequence of the combination codes output from the second memory. The first, second, and third memories may be dual-port synchronous memories, such as block random access memory embedded in an integrated circuit. The data stream may be a serial digital interface (SDI) data stream and the bit sequence may be a timing reference signal.

22 Claims, 5 Drawing Sheets

METHOD AND APPARATUS FOR DETECTING A BIT SEQUENCE IN A DATA STREAM

FIELD OF THE INVENTION

One or more aspects of the invention relate to digital signal processing and, more particularly, to a method and apparatus for detecting a bit sequence in a data stream.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

Presently, FGPAs are being used to implement receivers for digital video transmitted serially over a video coaxial cable in accordance with well known standards developed by the American National Standards Institute (ANSI) and the Society of Motion Picture and Television Engineers (SMPTE). Such standards include the serial digital interface (SDI) standard for transmitting standard definition digital video, as defined by ANSI/SMPTE 259M, and the high-definition serial digital interface (HD-SDI) standard for transmitting high-definition digital video, as defined by ANSI/SMPTE 292M. The SDI standard for standard definition digital video is referred to herein as "SD-SDI". The term "SDI" includes both HD-SDI and SD-SDI standards.

An SDI receiver includes a framer for determining where individual words begin and end in the serial data stream. In order to frame the data stream, the encoder periodically sends a unique and recognizable pattern (i.e., a bit sequence) for the framer to use as a framing reference. The unique bit sequence is referred to as a timing reference signal (TRS). In an HD-SDI data stream, each data word is 20 bits wide. The TRS symbols for HD-SDI data streams are 80 bits long, with the first 60 bits being a fixed pattern unique in the data stream. The first 60 bits of the HD-SDI TRS symbol written in 10-bit hexadecimal words is "3FF 3FF 000 000 000 000" (i.e., twenty "1" bits followed by forty "0" bits). In an SD-SDI data stream, each data word is 10 bits wide. The TRS symbols for SD-SDI data streams are 40 bits long, with the first 30 bits being a fixed pattern unique in the data stream. The first 30 bits of the SD-SDI TRS symbol written in 10-bit hexadecimal words is "3FF 000 000" (i.e., ten "1" bits followed by twenty "0" bits).

Present SDI receivers use various pattern matching circuits to detect TRS symbols. Due to the length of the TRS symbol in either HD-SDI or SD-SDI data streams, such pattern matching circuits require a significant amount of logic to implement. Such pattern matching circuits become even more complex for multi-rate SDI decoders capable of decoding both SD-SDI and HD-SDI data streams. This presents a significant challenge to FPGA designers, since there may be insufficient logic resources available in the fabric to implement an SDI receiver, in particular, multiple SDI receivers. In addition, it may be desirable to save logic resources within an FPGA to implement various video processing functions along with one or more SDI receivers.

Accordingly, there exists a need in the art for a method and apparatus that detects a bit sequence in a data stream using a reduced amount of logic.

SUMMARY OF THE INVENTION

Method and apparatus for detecting a bit sequence in a data stream is described. In one embodiment, a first memory is configured to process pairs of bit-patterns in the data stream to provide respective pairs of codes from a code table stored in said first memory. A second memory is configured to process pairs of codes from the first memory to provide combination codes from a combination code table stored in the second memory. A third memory is configured to generate detection data in response to a sequence of the combination codes output from the second memory. In one embodiment, the first, second, and third memories comprise dual-port synchronous memories. For example, the first, second, and third memories may comprise block random access memories within an integrated circuit, such as a field programmable gate array. In one embodiment, the data stream comprises a serial digital interface (SDI) data stream and the bit sequence comprises a timing reference signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for detecting a bit sequence in a data stream is described. One or more aspects of the invention are described with respect to a SDI framing circuitry implemented using an FPGA. As used herein, the term "SDI" encompasses HD-SDI, SD-SDI, and like type standards. Those skilled in the art will appreciate that the invention may be implemented using discrete circuits or other types of integrated circuits, such as application specific integrated circuits (ASICs), complex programmable logic devices (CPLDs), application specific standard products (ASSPs), and the like, as well as combinations of such integrated circuits and discrete circuits.

Figure 1:
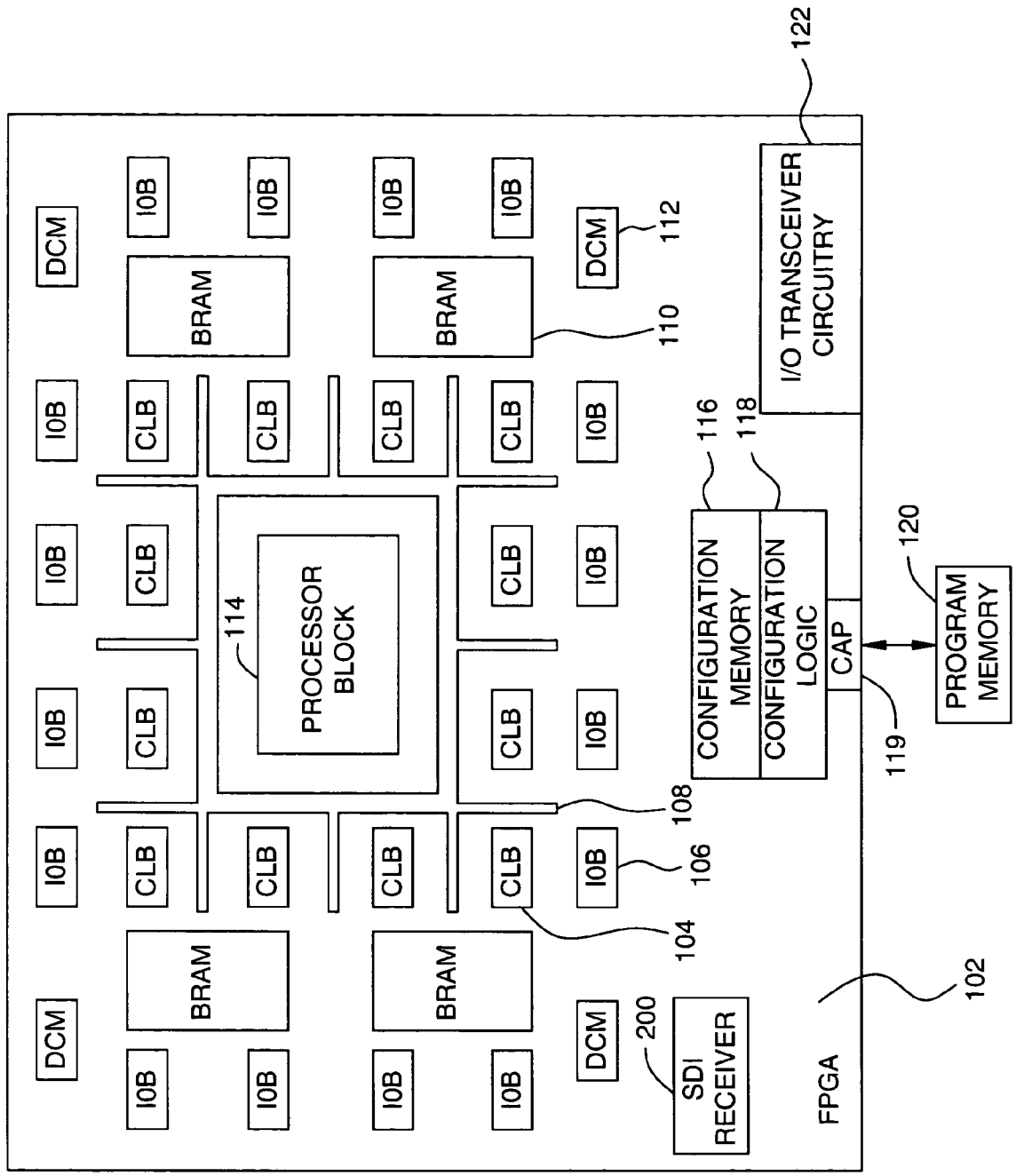
FIG. 1 is a block diagram depicting an exemplary embodiment of an FPGA coupled to a program memory.

FIG. 1 is a block diagram depicting an exemplary embodiment of an FPGA 102 coupled to a program memory 120. The FPGA 102 illustratively comprises programmable logic circuits or "blocks", illustratively shown as CLBs 104, IOBs 106, and programmable interconnect 108 (also referred to as "programmable logic"), as well as configuration memory 116 for determining the functionality of the FPGA 102. The FPGA 102 may also include an embedded processor block 114, as well as various dedicated internal logic circuits, illustratively shown as blocks of random access memory ("BRAM 110"), configuration logic 118, digital clock management (DCM) blocks 112, and input/output (I/O) transceiver circuitry 122. Notably, the FPGA 102 may include an SDI receiver 200. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. The configuration process of FPGA 102 is also well known in the art.

The I/O transceiver circuitry 122 may be configured for communication over any of a variety of media, such as wired, wireless, and photonic, whether analog or digital. The I/O transceiver circuitry 122 may comprise gigabit or multi-gigabit transceivers (MGTs). The SDI receiver 200 may be implemented using dedicated logic circuitry, programmable logic blocks, MGTs, or a combination thereof. An exemplary embodiment of the SDI receiver 200 is described below with respect to FIG. 2. The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 102 may be selected from the VIRTEX-II PRO family of products, commercially available from Xilinx, Inc. of San Jose, Calif.

Figure 2:
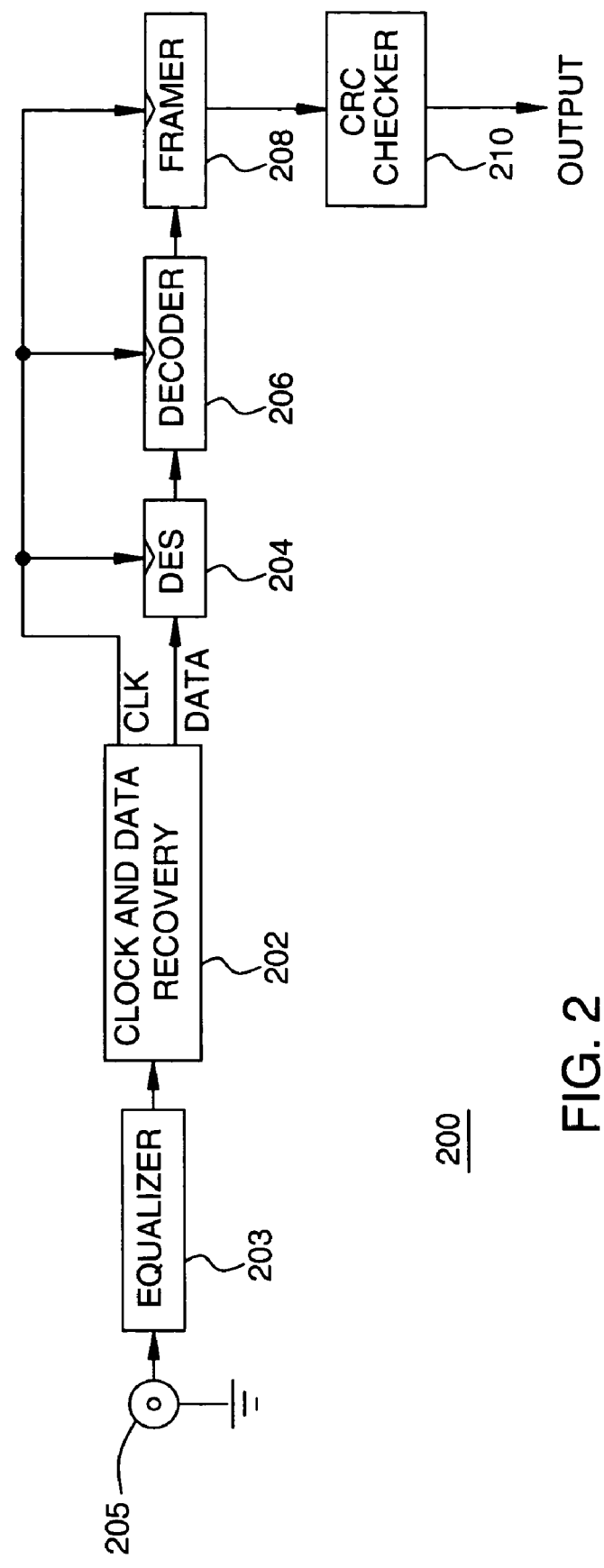
FIG. 2 is a block diagram depicting an exemplary embodiment of an SDI receiver.

FIG. 2 is a block diagram depicting an exemplary embodiment of an SDI receiver 200. The SDI receiver 200 comprises an equalizer 203, a clock and data recovery circuitry 202, a deserializer (DES) 204, a decoder 206, a framer 208, and a cyclic-redundancy-code (CRC) checker 210. An input interface of the equalizer 203 is configured to receive an SDI data stream from a source 205, such as a coaxial cable. The equalizer 203 comprises well-known circuits for equalizing the SDI data stream after transmission through the source 205.

An input interface of the clock and data recovery circuitry 202 is coupled to an output interface of the equalizer 203. The clock and data recovery circuitry 202 recovers the clock and data from the SDI data stream. The clock and data recovery circuitry 202 supplies a clock signal to clock ports of each of the deserializer 204, the decoder 206, and the framer 208. The clock and data recovery circuitry 202 supplies data to an input interface of the deserializer 204. The deserializer 204 converts the serial data stream into a sequence of n-bit words (e.g., 20-bit words for HD-SDI or 10-bit words for SD-SDI). The clock and data recovery circuitry 202 and the deserializer 204 may be implemented using an MGT in the FPGA 100.

An input interface of the decoder 206 receives n-bit words from the deserializer 204. The decoder 206 decodes the n-bit words in a well known manner. Notably, the decoder 206 is capable of decoding the n-bit data words without identifying the sample boundaries of the SDI data conveyed by the SDI data stream.

An input interface of the framer 208 is configured to decoded n-bit words from the decoder 206. The framer 208 processes the decoded n-bit words to identify a timing reference signal (TRS). Once the TRS symbol is identified, the framer 208 determines the bit-offset of the least significant bit of each sample in the decoded n-bit data words supplied by the decoder 206. Exemplary embodiments of bit sequence detectors for use as the framer 208 are described below. An input interface of the CRC checker 210 is configured to receive aligned data from the framer 208. The CRC checker 210 performs a well-known CRC checking process to determine if any errors have occurred in the transmission of the data. For a more detailed understanding of SDI receivers, the reader is referred to Snow, John F., "HD-SDI Receiver Using Virtex-II Pro RocketIO Multi-Gigabit Transceivers," Xilinx Application Note XAPP681, published Dec. 8, 2003; and Snow, John F., "Serial Digital Interface (SDI) Video Decoder," Xilinx Application Note XAPP288, published Sep. 17, 2001.

Figure 3:
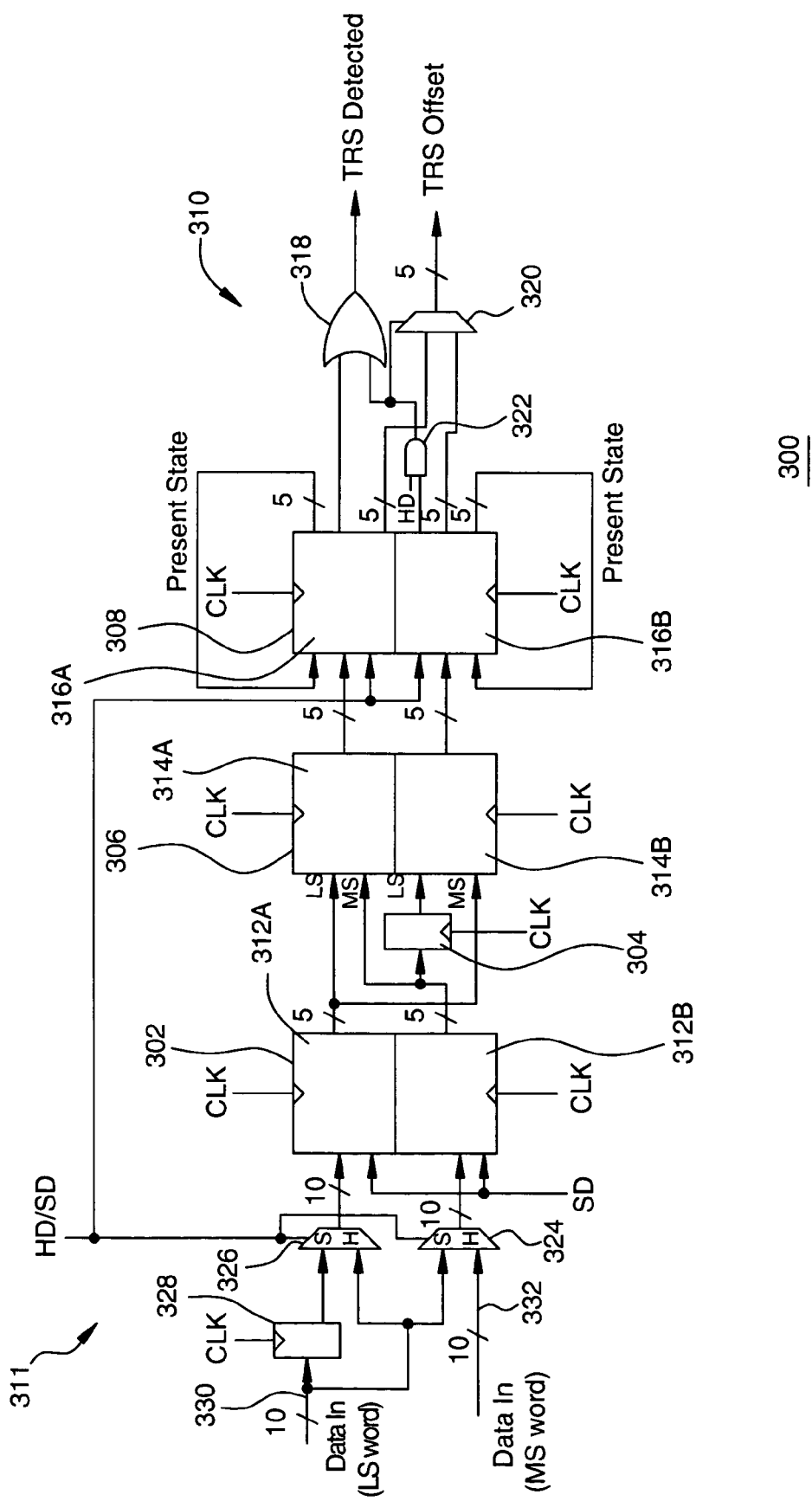
FIG. 3 is a block diagram depicting an exemplary embodiment of a bit sequence detector constructed in accordance with one or more aspects of the invention.

FIG. 3 is a block diagram depicting an exemplary embodiment of a bit sequence detector 300 constructed in accordance with one or more aspects of the invention. The bit sequence detector 300 is capable of selectively processing both HD-SDI data streams and SD-SDI data streams (i.e., the bit sequence detector 300 is a multi-rate detector). In the HD-SDI mode, the bit sequence detector 300 is configured to detect an HD-SDI TRS sequence (i.e., twenty "1" bits followed by forty "0" bits). In the SD-SDI mode, the bit sequence detector 300 is configured to detect an SD-SDI TRS sequence (i.e., ten "1" bits followed by twenty "0" bits). In this manner, the bit sequence detector 300 may be used as the framer 208 in the SDI receiver 200 shown in FIG. 2.

The bit sequence detector 300 comprises input logic 311, a memory 302, a register 304, a memory 306, a memory 308, and detection logic 310. The input logic 311 includes a register 328, a multiplexer 326, a multiplexer 324, an input terminal 330, and an input terminal 332. The detection logic 310 includes an OR gate 318, an AND gate 322, and a multiplexer 320. The memories 302, 306, and 308 comprise dual-port synchronous memories, such as random access memory (RAM) or read only memory (ROM). In one embodiment of the invention, the bit sequence detector 208 is implemented within an FPGA and the memories 302, 306, and 308 are implemented using BRAMs within the FPGA. While the memories 302, 306, and 308 may comprise RAM, the memories 302, 306, and 308 are not configured for writing, but rather as ROMs for storing tables.

The input terminals 330 and 332 are each 10 bits wide. An input terminal of the register 328 is coupled to the input terminal 330. An output terminal of the register 328 is coupled to a first input terminal (S) of the multiplexer 326. A clock terminal of the register 328 is configured to receive a clock signal CLK. The input terminal 330 is coupled to a second input terminal (H) of the multiplexer 326 and a first input terminal (S) of the multiplexer 324. The input terminal 332 is coupled to a second input terminal (H) of the multiplexer 324. Control terminals of the multiplexers 324 and 326 are configured to receive a signal HD/SD (high definition/standard definition). The "S" terminals of the multiplexers 324 and 326 are selected in standard definition mode, and the "H" terminals of the multiplexers 324 and 326 are selected in high definition mode.

The memory 302 includes a first port 312A and a second port 312B. Each of the ports 312A and 312B includes a 5-bit wide data terminal and an 11-bit wide address terminal. Clock terminals of the ports 312A and 312B are configured to receive the clock signal CLK. The address terminal of port 312A is coupled to an output terminal of the multiplexer 326 (10-bit output) and is configured to receive a signal SD (1-bit signal). The address terminal of port 312B is coupled to an output terminal of the multiplexer 324 (10-bit output) and is configured to receive the signal SD (1-bit signal).

The memory 306 includes a first port 314A and a second port 314B. Each of the ports 314A and 314B includes a 5-bit wide data terminal and a 10-bit wide address terminal. Clock terminals of the ports 314A and 314B are configured to receive a clock signal CLK. The address terminal of the port 314A coupled to the data terminal of the port 312A and the data terminal of the port 312B. A 5-bit word supplied by the port 312A comprises the least significant bits of an address coupled to the address terminal of the port 314A, and a 5-bit word supplied by the port 312B comprises the most significant bits of such an address.

An input terminal of the register 304 is coupled to the data terminal of the port 312B. A clock terminal of the register 304 is configured to receive the clock signal CLK. The address terminal of the port 314B is coupled to an output terminal of the register 304 and the data terminal of the port 312A. A 5-bit word supplied by the register 304 comprises the least significant bits of an address coupled to the address terminal of the port 314B, and a 5-bit word supplied by the port 312A comprises the most significant bits of such an address.

The memory 308 includes a first port 316A and a second port 316B. Each of the ports 316A and 316B includes an 11-bit wide data terminal and an 11-bit wide address terminal. Clock terminals of the ports 316A and 316B are configured to receive the clock signal CLK. The address terminal of the port 316A is coupled to the data terminal of the port 314A and is configured to receive the signal HD/SD and a 5-bit word as feedback from the data terminal of the port 316A. The address terminal of the port 316B is coupled to the data terminal of the port 314B and is configured to receive the signal HD/SD and a 5-bit word as feedback from the data terminal of the port 316B.

A first input terminal of the AND gate 322 is coupled to the data terminal of the port 316B (1-bit output), and a second input terminal of the AND gate 322 is configured to receive a signal HD. A first input terminal of the OR gate 318 is coupled to the data terminal of the port 316A (1-bit output), and a second input terminal of the OR gate 318 is coupled to the output terminal of the AND gate 322. An output terminal of the OR gate 318 supplies a TRS detected signal. A first input terminal of the multiplexer 320 is coupled to the data terminal of the port 316A (5-bit output), and a second input terminal of the multiplexer 320 is coupled to the data terminal of the port 316B (5-bit output). A selection terminal of the multiplexer 320 is coupled to the output terminal of the AND gate 322. An output terminal of the multiplexer 320 supplies a TRS offset value.

In operation, the bit sequence detector 300 is capable of selectively processing HD-SDI data streams and SD-SDI data streams. The mode is determined by the signal HD/SD. In HD-SDI mode, the input terminal 330 is configured to receive a first 10 bits (referred to as the least significant word or "LS word"), and the input terminal 332 is configured to receive a second 10 bits (referred to as the most significant or "MS word"). Together, the LS word and the MS word comprise a 20-bit input word. The LS word is coupled to the port 312A through the multiplexer 326, and the MS word is coupled to the port 312B through the multiplexer 324. The signal SD is not asserted in the HD-SDI mode.

The memory 302 is configured to store particular pattern codes that are selectable using the address terminals of the ports 312A and 312B. That is, for each of the ports 312A and 312B, an 11-bit address value coupled to the address terminal yields a particular 5-bit code at the data terminal. For the ports 312A and 312B, the first 10 bits of the address values comprise an LS word and an MS word, respectively. The last bit (MSB) of each address value is the SD signal, which is used to indicate the SD-SDI mode. The memory 302 is configured to detect 10-bit words that begin with or end with a sequence of 1's and 0's. The memory 302 is configured to process two 10-bit words for each clock cycle.

There are 29 interesting patterns grouped into three separate groups designated as A, B, and C pattern groups. The A pattern group comprises 10-bit words that have a sequence of "1" bits in the most significant bits (MSBs), as shown in Table 1 below.

TABLE 1

| Input Bits | Pattern Code |
|---|---|
| 11_1111_1111 | A0 |
| 11_1111_1110 | A1 |
| 11_1111_110X | A2 |
| 11_1111_10XX | A3 |
| 11_1111_0XXX | A4 |
| 11_1110_XXXX | A5 |
| 11_110X_XXXX | A6 |
| 11_10XX_XXXX | A7 |
| 11_0XXX_XXXX | A8 |
| 10_XXXX_XXXX | A9 |

A bit value of "X" indicates any value of 1 or 0. The patterns listed in Table 1 comprise all the possible patterns that can begin a TRS sequence along with their codes. Notably, an A0 pattern (i.e., all 1's) does not indicate that the TRS sequence actually begins in the least significant bit (LSB) of the given 10-bit word. Rather, an A0 pattern simply indicates that the given 10-bit word contains 10 "1" bits.

The B pattern group comprises 10-bit words that have a sequence of "0" bits in the MSBs immediately followed by a sequence of "1" bits in the LSBs, as shown in Table 2 below. The patterns listed in Table 2 comprise all the possible patterns that can occur at the transition in the TRS sequence between the leading sequence of "1" bits to the trailing sequence of "0" bits.

TABLE 2

| Input Bits | Pattern Code |
| --- | --- |
| 00_0000_0000 | B0 |
| 00_0000_0001 | B1 |
| 00_0000_0011 | B2 |
| 00_0000_0111 | B3 |
| 00_0000_1111 | B4 |
| 00_0001_1111 | B5 |
| 00_0011_1111 | B6 |
| 00_0111_1111 | B7 |
| 00_1111_1111 | B8 |
| 01_1111_1111 | B9 |

The C pattern group comprises 10-bit words that have a sequence of "0" bits in the LSBs, as shown in Table 3 below. The patterns in Table 3 occur at the end of the TRS sequence (i.e., the patterns complete a sequence of 20 "0" bits). While the patterns in the C pattern group are not required for HD-SDI data streams, they are described here for completeness. The C patterns are used in the SD-SDI mode, the operation of which is described below.

TABLE 3

| Input Bits | Pattern Code |
| --- | --- |
| 11_1111_1110 | C1 |
| 11_1111_110X | C2 |
| 11_1111_10XX | C3 |
| 11_1111_0XXX | C4 |
| 11_1110_XXXX | C5 |
| 11_110X_XXXX | C6 |
| 11_10XX_XXXX | C7 |
| 11_0XXX_XXXX | C8 |
| 10_XXXX_XXXX | C9 |

Notably, some of the patterns in the C pattern group also appear in the A pattern group. For example, a word of 11_0000_0000 can be interpreted as either an A8 pattern or a C8 pattern. For an HD_SDI data stream, any such ambiguous pattern is always interpreted as an A pattern, since the C patterns are not used. In addition, while there are 10 patterns in each of the A and B pattern groups, the C pattern group includes only 9 patterns. The tenth C pattern would be all 1's. The C patterns are for patterns that come at the end of the TRS sequence. However, a word of all 1's is really only useful at the beginning of a TRS sequence, so a word of all 1's is interpreted as an A0 pattern.

Any input word to the memory 302 that does not fall into these three pattern groups is referred to as an XX pattern (i.e., a "do not care" pattern) and is immediately recognized as not belonging to a TRS sequence. With the XX pattern, there are 30 unique codes that the memory 302 can generate in response to address values, each of which is encoded using five bits.

The memory 306 is configured to store particular combination codes that are selected using the address terminals of the ports 314A and 314B. That is, for each of the ports 312A and 312B, a 10-bit address value coupled to the address terminal yields a particular 5-bit combination code at the data terminal. For the port 314A, the first 5 LSBs of the address value comprises a code supplied by the port 312A, and the last 5 MSBs of the address value comprises a code supplied by the port 312B. For the port 314B, the first 5 LSBs of the address value comprises a code supplied by the register 304 (i.e., a code output from the port 312B for the previous clock cycle), and the last 5 MSBs of the address value comprises a code supplied b the port 312A.

The memory 306 is configured to detect combinations of pattern codes supplied by the memory 302. The memory 306 is used to process two pattern codes supplied by the ports 312A and 312B of the memory 302 and culls out those pattern combinations that are not valid as part of a TRS sequence. Even though the ports 312A and 312B may be both generated valid pattern codes, most of the combinations of such pattern codes are not valid as part of a TRS sequence. The memory 306 effectively processes 20 input bits at a time and determines when the complete 20-bit input word could be a legal part of a TRS pattern.

Of all the combinations of pattern code inputs, the memory 306 only generates 30 valid combination pattern codes in response to address values. There are actually more valid combinations than 30, but many of the combinations may be combined due to "do not care" cases. Adding one code to indicate all invalid combinations yields a total of 31 codes that the memory 306 must generate, which is represented by a 5-bit output. The valid combination of pattern codes and the resulting combination code output is shown in Table 4.

TABLE 4

| LS Pattern In | MS Pattern In | Combination Code Output |
| --- | --- | --- |
| A0 | B0 | A0B0 |
| A[1:0] | B1 | AXB1 |
| A[2:0] | B2 | AXB2 |
| A[3:0] | B3 | AXB3 |
| A[4:0] | B4 | AXB4 |
| A[5:0] | B5 | AXB5 |
| A[6:0] | B6 | AXB6 |
| A[7:0] | B7 | AXB7 |
| A[8:0] | B8 | AXB8 |
| A[9:0] | B9 | AXB9 |
| B0 | B0 | B0B0 |
| B1 | B0 | B1B0 |
| B2 | B0 | B2B0 |
| B3 | B0 | B3B0 |
| B4 | B0 | B4B0 |
| B5 | B0 | B5B0 |
| B6 | B0 | B6B0 |
| B7 | B0 | B7B0 |
| B8 | B0 | B8B0 |
| B9 | B0 | B9B0 |
| B0 | C1 | B0C1 |
| B0 | C2 | B0C2 |
| B0 | C3 | B0C3 |
| B0 | C4 | B0C4 |
| B0 | C5 | B0C5 |
| B0 | C6 | B0C6 |
| B0 | C7 | B0C7 |
| B0 | C8 | B0C8 |
| B0 | C9 | B0C9 |
| B0 | XX | B0XX |
| All other combinations | | XXXX |

The notation A[M:N] denotes all patterns from the Mth A pattern through the Nth A pattern, inclusive. The combinations including the C patterns are not required for HD-SDI data streams, but are used to detect SD-SDI TRS sequences. Each of the ports 314A and 314B of the memory 306 is effectively processing 20-bit wide input vectors to determine if those 20 input bits form part of a TRS sequence. However, the ports 314A and 314B are processing a different set of 20 input bits. Notably, the port 314A looks for valid sequences that begin in the LS input word. The port 314B looks for valid sequences that begin in the MS input word. To do this, the pattern code from the port 312A is the MS pattern input to the port 314B, and the pattern code from the register 304 is the LS pattern input to the port 314B. The register 304 supplies the pattern code from the port 312B from the previous clock cycle. In this manner, the port 314B of the memory 306 looks for 20-bit patterns that begin in the MS input word and extend through the LS input word of the next clock cycle.

The memory 308 is configured to implement a pair of finite state machines (FSMs). The combination codes from the memory 306 indicate when a valid fragment of a TRS sequence is detected across 20 input bits. The memory 308 determines if the proper combinations are detected in the proper order to form a complete TRS sequence. The sequences of valid combination codes are unique for each different bit offset at which the TRS sequence can begin. By verifying the sequence of combination codes, the memory 308 not only detects a TRS sequence, but also determines the bit in the 20-bit input word where the TRS sequence begins (i.e., TRS bit offset). A state diagram depicting an exemplary embodiment of a process executed by the FSMs implemented by the memory 308 is described below with respect to FIG. 4.

The port 316A processes combination codes from the port 314A of the memory 306 and only detects TRS sequences that start in the LS input word. The port 316B processes combination codes from the port 314B of the memory 306 and only detects TRS sequences that start in the MS input word. For each of the ports 316A and 316B, an FSM generates a TRS detected output and an offset code indicating where the detected TRS symbol begins in the 20-bit input word. Both FSMs implemented by the memory 308 do not detect a TRS sequence at the same time.

The TRS detected output from the port 316A is coupled to the OR gate 318. The TRS detected output from the port 316B is coupled to the AND gate 322, and the output of the AND gate 322 is coupled to the OR gate 318. As described below, the port 316B is not used in SD-SDI mode, so the AND gate 322 functions to only pass the TRS detected output of the port 316B is the signal HD is asserted. The two TRS detected outputs of the memory 308 are OR'ed together by the OR gate 318 to produce a single TRS detected signal. The multiplexer 320 is used to select the offset code from either the port 316A or the port 316B, depending on which of the ports 316A and 316B asserted the TRS detected signal. Although the detection logic 310 has been described as having an OR gate and an AND gate, those skilled in the art will appreciate that other types of logic gates may be used in various combinations to perform identical logic functions.

In SD-SDI mode, the input terminal 330 is configured to receive a 10-bit data word (denoted the LS word). The input terminal 332 is not used in SD-SDI mode. The LS word of the current clock cycle is coupled to the port 312B, and the LS word of the previous clock cycle is coupled to the port 312A via the register 528. The signal SD is asserted in the SD-SDI mode. Since the data words are only 10 bits, and thus the TRS starting bit offset can only be 0 through 9, only the port 314A of the memory 306 and the port 316A of the memory 308 are used.

As described above, in HD-SDI mode, the bit sequence detector 300 looks for a sequence of 10 ones followed by 20 zeros. However, this sequence is embedded within the longer sequence of 20 ones followed by 40 zeros that actually comprises the HD-SDI TRS symbol. In HD-SDI mode, the bit sequence detector 300 takes advantage of the fact that there are 40 zeros at the end of the pattern to make it easier to detect the pattern. The HD-SDI TRS detection algorithm actually detects a sequence of 10 ones followed by 20 or more zeros. There will always be 20 extra zeros at the end of the sequence that are not needed, but can be relied on to simplify the HD-SDI algorithm.

The SD-SDI TRS symbol, however, does not include the extra 20 zero bits. The first bit after the 10 ones and 20 zeros could be a "1". Thus, in SD-SDI mode, the C patterns are used to detect that the input pattern has enough trailing zeros to complete the SD-SDI TRS sequence. Notably, as described above, some patterns input to the memory 302 are ambiguous and fall into both the A pattern group and the C pattern group. For SD-SDI, the ambiguous patterns must be interpreted as both A and C patterns in order to correctly identify all TRS sequences. For example, an input value of 11_0000_0000 can be both an A8 pattern and a C8 pattern. This pattern can either begin a TRS sequence with the 2 one bits, or it could end a TRS sequence with its 8 zero bits.

In SD-SDI mode, the double evaluation of each 10-bit input word accounts for the A/C pattern ambiguity. In the port 312A, the A patterns are given priority. In the port 312B, the C patterns are given priority. Configuration of the ports 312A and 312B to give priority to the A patterns or C patterns is controlled by the SD signal. Thus, every word is evaluated as part of a TRS sequence both as an A pattern and a C pattern. The memories 306 and 308 operate similarly in the SD-SDI mode as in the HD-SDI mode, with the exception that only one port in each of the memories 306 and 308 is used.

Figure 4:
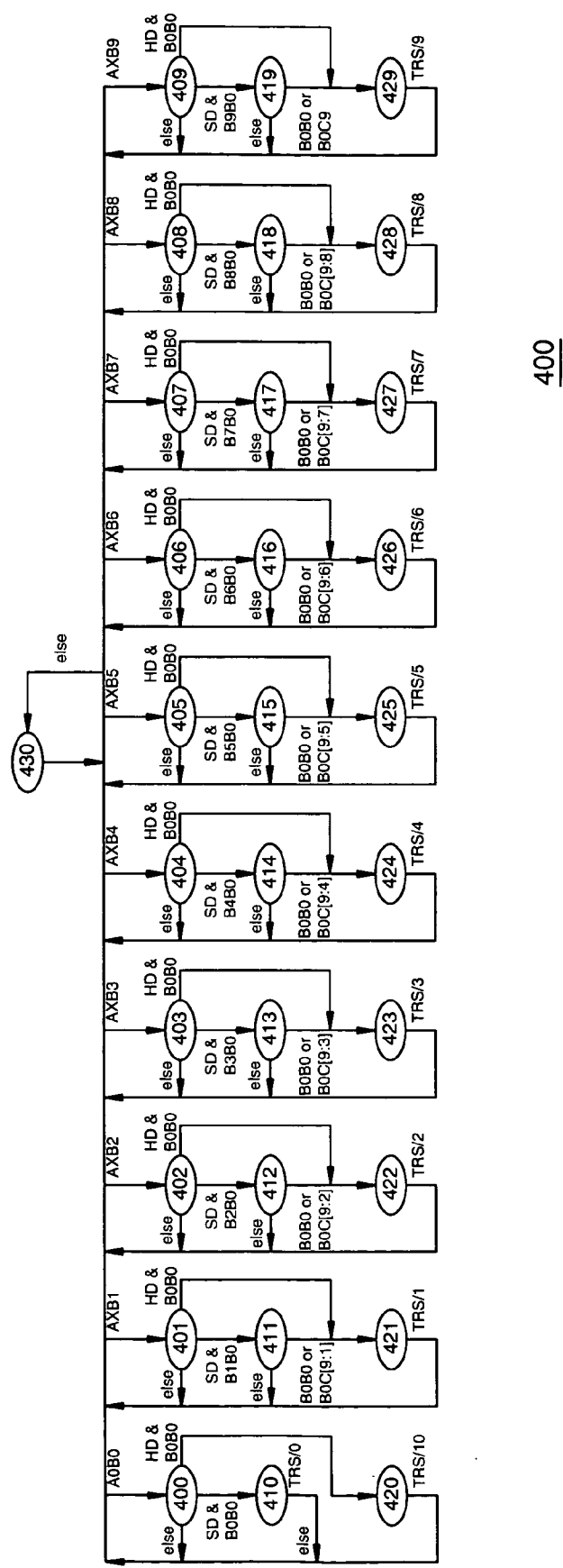
FIG. 4 is a state diagram depicting an exemplary embodiment of a process executed by a finite state machine implemented the bit sequence detector of FIG. 3.

FIG. 4 is a state diagram depicting an exemplary embodiment of a process 400 executed by a FSM implemented within the memory 308 shown in FIG. 3. The process 400 includes 31 states designated as states 400-429 and an initial state 430. From the initial state 430, the process 400 proceeds to one of states 400 through 409 in response to a particular combination code condition, as shown below in Table 5.

TABLE 5

| Current State | Next State | Condition |
| --- | --- | --- |
| 430 | 400 | A0B0 |
| 430 | 401 | AXB1 |
| 430 | 402 | AXB2 |
| 430 | 403 | AXB3 |
| 430 | 404 | AXB4 |
| 430 | 405 | AXB5 |
| 430 | 406 | AXB6 |
| 430 | 407 | AXB7 |
| 430 | 408 | AXB8 |
| 430 | 409 | AXB9 |

In the event that none of the combination code conditions in Table 5 are asserted, the process 400 remains in the initial state 430.

If in SD-SDI mode, the process 400 proceeds from one of states 400 through 409 to one of states 410 through 419, respectively, in accordance with the conditions set forth in Table 6.

TABLE 6

| Current State | Next State | Condition |
| --- | --- | --- |
| 400 | 410 | B0B0 |
| 401 | 411 | B1B0 |
| 402 | 412 | B2B0 |
| 403 | 413 | B3B0 |

TABLE 6-continued

| Current State | Next State | Condition |
|---|---|---|
| 404 | 414 | B4B0 |
| 405 | 415 | B5B0 |
| 406 | 416 | B6B0 |
| 407 | 417 | B7B0 |
| 408 | 418 | B8B0 |
| 409 | 419 | B9B0 |

In the event that none of the conditions in Table 6 are asserted, the process 400 returns to the initial state 430.

At state 410, the process 400 outputs a TRS detection signal with a bit offset of zero (denoted as "TRS/0"). The process 400 returns to the initial state 430 from the state 410. The process 400 proceeds from one of states 411 through 419 to one of states 421 through 429, respectively, in accordance with the conditions set forth in Table 7.

TABLE 7

| Current State | Next State | Condition |
|---|---|---|
| 411 | 421 | B0B0 or B0C[9:1] |
| 412 | 422 | B0B0 or B0C[9:2] |
| 413 | 423 | B0B0 or B0C[9:3] |
| 414 | 424 | B0B0 or B0C[9:4] |
| 415 | 425 | B0B0 or B0C[9:5] |
| 416 | 426 | B0B0 or B0C[9:6] |
| 417 | 427 | B0B0 or B0C[9:7] |
| 418 | 428 | B0B0 or B0C[9:8] |
| 419 | 429 | B0B0 or B0C9 |

In Table 8, the notation C[M:N] denotes all patterns between the Mth C pattern and the Nth C pattern, inclusive. In the event that none of the conditions in Table 7 are asserted, the process 400 returns to the initial state 430.

At states 420 through 429, the process 400 outputs a TRS detection signal with a bit offset in accordance with Table 8.

TABLE 8

| State | Output |
|---|---|
| 420 | TRS/10 |
| 421 | TRS/1 |
| 422 | TRS/2 |
| 423 | TRS/3 |
| 424 | TRS/4 |
| 425 | TRS/5 |
| 426 | TRS/6 |
| 427 | TRS/7 |
| 428 | TRS/8 |
| 429 | TRS/9 |

If in HD-SDI mode, the process 400 proceeds from one of states 400 through 409 to one of states 420 through 429, respectively, in accordance with the conditions set forth in Table 9.

TABLE 9

| Current State | Next State | Condition |
|---|---|---|
| 400 | 420 | B0B0 |
| 401 | 421 | B0B0 |
| 402 | 422 | B0B0 |
| 403 | 423 | B0B0 |
| 404 | 424 | B0B0 |
| 405 | 425 | B0B0 |

TABLE 9-continued

| Current State | Next State | Condition |
|---|---|---|
| 406 | 426 | B0B0 |
| 407 | 427 | B0B0 |
| 408 | 428 | B0B0 |
| 409 | 429 | B0B0 |

In the event that none of the conditions in Table 9 are asserted, the process 400 returns to the initial state 430.

With reference to FIGS. 3 and 4, operation of the bit sequence detector 300 in SD-SDI mode can be more thoroughly understood with reference to the following example. Four input words are coupled to the bit sequence detector 300 in the sequence shown below. The associated pattern code output is shown with each input word.

Input Word 1: 11_0011_0000 (C4 or A8)
Input Word 2: 00_1111_1111 (B8)
Input Word 3: 00_0000_0000 (B0)
Input Word 4: 11_0000_0000 (C8 or A8)

The first word can be either an A8 or C4 pattern. In this case, the correct interpretation is as an A8 pattern to start the TRS sequence. Likewise, the fourth word can be either an A8 or C8 pattern. In this case, the correct interpretation is as a C8 pattern to complete the TRS sequence.

The TRS sequence begins with two "1" bits in the two MSBs of the first input word and ends with the eight "0" bits in the 8 LSBs of the fourth input word. Table 10 shows how these four input words flow through the bit sequence detector 300. Each word is coupled to the port 312B on the first clock cycle and to the port 312A on the second clock cycle.

TABLE 10

| Clock Cycle | Port 312A Pattern Code | Port 312B Pattern Code | Port 314A Combination Code | Port 316A Sequence State |
|---|---|---|---|---|
| 1 | XX | C4 | XXXX | 430 |
| 2 | A8 | B8 | AXB8 | 408 |
| 3 | B8 | B0 | B8B0 | 418 |
| 4 | B0 | C8 | B0C8 | 428 |

In the first clock cycle, the port 312A is processing the word that preceded the TRS sequence, which can be any value (XX). The first word of the TRS sequence (11_0011_0000) is evaluated by the port 312B to produce a pattern code of C4, since the port 312B gives priority to C pattern codes. This results in an invalid combination (XXXX) so the FSM implemented by the port 316A stays in the initial state 430.

In the second clock cycle, the first word of the sequence has moved to the port 312A and is interpreted as an A8 pattern, since the port 312A gives priority to the A pattern codes. At the same time, the port 312B processes the second word and produces a pattern code of B8. The port 314A processes this combination to produce a valid combination code of AXB8, which causes the FSM implemented by the port 316A to move to state 408.

In the third clock cycle, the second word is evaluated by the port 312A, producing the code B8. The third word is evaluated by the port 312B, producing the code B0. The port 314A evaluates this combination to produce a valid combination code of B8B0, which cause the FSM implemented by the port 316A to move to state 418.

In the fourth clock cycle, the third word is evaluated by the port 312A, producing the code B0. The fourth word is evaluated by the port 312B, producing the code C8, since the port 312B gives priority to the C pattern codes. The port 314A evaluates this combination to produce a valid combination code of B0C8, which causes the FSM implemented by the port 316A to move to state 428. In state 428, the TRS detected output is asserted and an offset code of 8 is generated, which indicates that the TRS sequence begins in bit 8 of the first input word.

Figure 5:
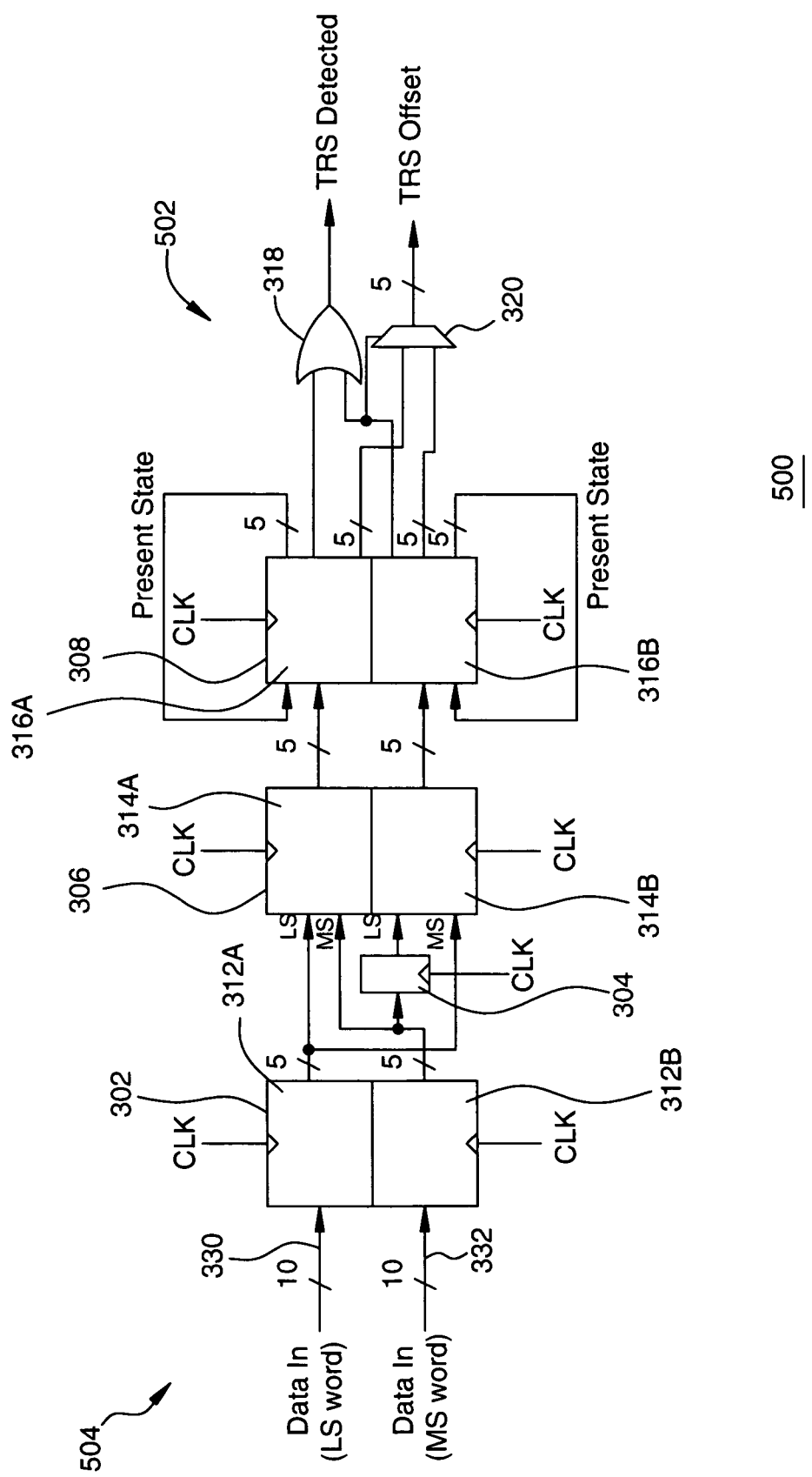
FIG. 5 is a block diagram depicting another exemplary embodiment of a bit sequence detector constructed in accordance with the invention.

FIG. 5 is a block diagram depicting another exemplary embodiment of a bit sequence detector 500 constructed in accordance with the invention. The bit sequence detector 300 is configured to process an HD-SDI data stream to identify a TRS sequence (i.e., twenty "1" bits followed by forty "0" bits). Elements of FIG. 5 that are the same or similar to elements of FIG. 3 are designated with identical reference numerals and are described in detail above.

In the present embodiment, the input terminal 330 and the input terminal 332 comprise input logic 504 of the bit sequence detector 500. The input terminal 330 is coupled to the address terminal of the port 312A, and the input terminal 332 is coupled to the address port of the port 312B. The OR gate 318 and the multiplexer 320 comprise detection logic 502 of the bit sequence detector 500. The first input terminal of the OR gate 318 is coupled to the data terminal of the port 316A, and the second input terminal of the OR gate 318 is coupled to the data terminal of the port 316B. The selection terminal of the multiplexer 320 is coupled to the data terminal of the port 316B.

Operation of the bit sequence detector 500 is identical to that described above with respect to the bit sequence detector 300 in the HD-SDI mode. In the present embodiment, the AND gate 322, multiplexers 324 and 326, and the register 328 are not required, since the bit sequence detector 500 is only configured to detecting TRS symbols of HD-SDI data streams. Moreover, the address terminals of the ports 312A, 312B, 316A, and 316B are only 10 bits wide, since the signals SD and HD/SD are not required.

In another embodiment, in the bit sequence detector 500, the memory 302 and the memory 306 may be part of a single memory circuit. The single memory circuit may be clocked at two times the frequency of the clock signal CLK, and the functions of the single memory circuit may be alternated between the function of the memory 302 and the function of the memory 306.

Method and apparatus for detecting a bit sequence in a data stream has been described. In one embodiment, TRS symbols in SDI data streams, such as HD-SDI data streams and SD-SDI data streams, are advantageously detected using three memories. In one embodiment, the memories may be BRAMS in an integrated circuit, such as an FPGA. One embodiment of the invention identifies a small and unique set of bit patterns using a first memory and then culls out invalid combinations of pairs of bit patterns using a second memory, resulting in a small set of legal combinations. A third memory is used to detect a sequence of such legal combinations and thereby detect a TRS symbol.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for detecting a bit sequence in a data stream, comprising:
   a framer;
   a first memory configured to cause the framer to process pairs of bit patterns in said data stream to provide respective pairs of codes from a code table stored therein;
   a second memory configured to cause the framer to process said pairs of codes to provide combination codes from a combination code table stored therein;
   each of said combination codes representing a combination of codes in a respective one of said pairs of codes; and
   a third memory configured to cause the framer to detect the bit sequence, and to generate detection data indicative of where the bit sequence begins in the data stream by using a set of state machines that transition from an initial state to a final state in response to each of said combination codes to determine if a sequence of said combination codes is detected in a particular order to form the bit sequence.

2. The apparatus of claim 1, wherein each of said first memory, said second memory, and said third memory comprises a synchronous dual-port memory.

3. The apparatus of claim 2, wherein, for each clock cycle, a first port of said first memory is configured to process a first bit pattern, and a second port of said first memory is configured to process a second bit pattern.

4. The apparatus of claim 3, wherein said bit sequence comprises a timing reference signal and said data stream comprises a serial digital interface (SDI) data stream.

5. The apparatus of claim 4, wherein SDI data stream comprises one of a high-definition SDI (HD-SDI) data stream and a standard definition SDI (SD-SDI) data stream.

6. The apparatus of claim 5, further comprising:
   input logic in communication with said first port and said second port, said input logic configured to select between an HD-SDI mode and an SD-SDI mode in response to a control signal.

7. The apparatus of claim 3, further comprising:
   a register coupled to said second port of said first memory; and
   said second memory including a third port coupled to each of said first port and said second port, and a fourth port coupled to each of said first port and said register.

8. The apparatus of claim 7, wherein said third memory includes a fifth port coupled to said third port and a sixth port coupled to said fourth port.

9. The apparatus of claim 8, further comprising:
   detection logic in communication with said fifth port and said sixth port.

10. The apparatus of claim 9, wherein said detection logic comprises at least one logic gate and a multiplexer.

11. The apparatus of claim 2, wherein each of said first memory, said second memory, and said third memory comprises a block random access memory in an integrated circuit.

12. The apparatus of claim 1, wherein said first memory and said second memory comprise a first dual-port memory circuit, and said third memory comprises a second dual-port memory circuit.

13. The apparatus of claim 1, wherein said bit sequence comprises a timing reference signal (TRS) and said data stream comprises a serial digital interface (SDI) data stream, and wherein said detection data comprises a TRS detect flag and bit offset data.

14. A method for detecting a bit sequence in a data stream, comprising:
- processing a pair of bit patterns to provide a pair of codes from a code table stored in a first memory;
- processing said pair of codes to provide combination codes from a combination code table stored in a second memory;
- each of said combination codes representing a combination of codes in a respective one of said pairs of codes; and
- generating detection data by using a set of state machines that transition from an initial state to a final state in response to each of said combination codes to determine if a sequence of said combination codes is detected in a particular order to form the bit sequence, where the detection data is indicative of where the bit sequence begins in the data stream.

15. The method of claim 14, wherein said first memory is a dual-port synchronous memory, and wherein said pair of bit patterns is processed during a single clock cycle.

16. The method of claim 14, wherein said bit sequence comprises a timing reference signal and said data stream comprises a serial digital interface (SDI) data stream.

17. The method of claim 16, wherein SDI data stream comprises one of a high-definition SDI (HD-SDI) data stream and a standard definition SDI (SD-SDI) data stream.

18. The method of claim 17, further comprising:
- selecting between an SD-SDI mode and an HD-HDI mode prior to processing said pair of bit patterns.

19. The method of claim 16, wherein said detection data comprises a timing reference signal detect flag and bit offset data.

20. Apparatus for receiving a data stream, comprising:
an equalizer configured to equalize said data stream;
clock and data recovery circuitry configured to recover clock information and data from said equalized data stream;
a deserializer configured to convert said data into a sequence of words;
a decoder configured to decode said words; and
a framer configured to detect a bit sequence in said words, said framer including:
- a first memory configured to process pairs of bit patterns in said words to provide respective pairs of codes from a code table stored therein;
- a second memory configured to process said pairs of codes to provide combination codes from a combination code table stored therein;
- each of said combination codes representing a combination of codes in a respective one of said pairs of codes; and
- a third memory configured to detect the bit sequence, and to generate detection data indicative of where the bit sequence begins in the data stream by using a set of state machines that transition from an initial state to a final state in response to each of said combination codes to determine if a sequence of said combination codes is detected in a particular order to form the bit sequence.

21. The apparatus of claim 20, wherein the apparatus is in a programmable logic device (PLD).

22. The apparatus of claim 20, wherein the programmable logic device (PLD) is a field programmable gate array.

* * * * *